US012704438B2

(12) United States Patent
Saez et al.

(10) Patent No.: US 12,704,438 B2
(45) Date of Patent: Aug. 11, 2026

(54) AUTONOMOUS QUALITY TEST SYSTEM FOR A VEHICLE

(71) Applicant: GM Global Technology Operations LLC, Detroit, MI (US)

(72) Inventors: Miguel Arturo Saez, Clarkston, MI (US); John Patrick Spicer, Plymouth, MI (US); Ahmad Almarkhi, Farmington Hills, MI (US); Raihan Haque, Warren, MI (US); Ana Beatriz Luiz da Silva, Gravataí (BR); Thiagarajan Chidambareswaran, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/816,446

(22) Filed: Aug. 27, 2024

(65) Prior Publication Data

US 2026/0063513 A1 Mar. 5, 2026

(51) Int. Cl.
*G01M 17/007* (2006.01)
*G07C 5/00* (2006.01)

(52) U.S. Cl.
CPC ........... *G01M 17/007* (2013.01); *G07C 5/006* (2013.01); *G07C 5/008* (2013.01)

(58) Field of Classification Search
CPC ...... G01M 17/007; G07C 5/006; G07C 5/008
USPC ........................................................ 701/31.4
See application file for complete search history.

(56) References Cited

U.S. PATENT DOCUMENTS

| | | | | |
|---|---|---|---|---|
| 10,459,444 | B1 * | 10/2019 | Kentley-Klay | G05D 1/0221 |
| 10,599,155 | B1 * | 3/2020 | Konrardy | G06N 3/045 |
| 10,599,546 | B1 * | 3/2020 | Walther | G06F 11/3013 |
| 11,521,438 | B2 * | 12/2022 | Kim | G06F 16/635 |
| 11,755,469 | B2 * | 9/2023 | Atmeh | G06F 11/3476 701/32.8 |
| 2016/0163130 | A1 * | 6/2016 | Zagajac | G07C 5/0808 701/29.1 |
| 2017/0116793 | A1 * | 4/2017 | Lin | G07C 5/085 |
| 2017/0125034 | A1 * | 5/2017 | Kakadiaris | G06F 3/165 |
| 2018/0204398 | A1 * | 7/2018 | Smith | G07C 5/0808 |
| 2018/0365908 | A1 * | 12/2018 | Liu | G06N 20/00 |
| 2019/0009789 | A1 * | 1/2019 | Zhang | B60W 50/045 |

(Continued)

*Primary Examiner* — Luis A Martinez Borrero
(74) *Attorney, Agent, or Firm* — Honigman LLP; Matthew H. Szalach

(57) ABSTRACT

A computer-implemented method when executed by data processing hardware causes the data processing hardware to perform operations. The operations include maneuvering, autonomously, a vehicle along a test track, monitoring, via at least one audio sensor, audio data from the vehicle during the maneuvering of the vehicle along the test track, and monitoring, via a monitoring system disposed along the test track, monitoring data of the vehicle along the test track. The operations also include executing, based on the monitored audio data, a sound detection function of an autonomous test algorithm, detecting, via the sound detection function, an error noise, categorizing, via a categorization function of the autonomous test algorithm, the detected error noise, identifying, based on the categorized error noise, a maintenance station and executing, in response to the identified maintenance station and categorized error noise, a spontaneous path planning function of the autonomous test algorithm.

18 Claims, 8 Drawing Sheets

(56) References Cited

U.S. PATENT DOCUMENTS

2019/0011927 A1* 1/2019 Mou .................... G05D 1/0253
2019/0066399 A1* 2/2019 Jiang ...................... G07C 5/006
2019/0079536 A1* 3/2019 Zhu ...................... G05D 1/0253
2019/0080528 A1* 3/2019 Bednar .................. G07C 5/006
2019/0278698 A1* 9/2019 Ahner ................. G06F 11/3698
2019/0303759 A1* 10/2019 Farabet .................. G06N 3/063
2020/0027292 A1* 1/2020 Watson ............... G01M 17/007
2020/0043258 A1* 2/2020 Jiang ...................... G07C 5/008
2020/0294401 A1* 9/2020 Kerecsen ............... G08G 1/205
2020/0339109 A1* 10/2020 Hong .................. G01M 17/007
2021/0179109 A1* 6/2021 Mori ................... G01M 17/025
2021/0192860 A1* 6/2021 Kale ...................... G07C 5/006
2021/0335061 A1* 10/2021 Claessens ............ G07C 5/0816
2021/0335062 A1* 10/2021 Claessens ................ G06N 7/01
2021/0335064 A1* 10/2021 Kim ..................... G07C 5/0808
2021/0342211 A1* 11/2021 Melo ................... G06F 11/0751
2022/0091973 A1* 3/2022 Atmeh ................ G06F 11/3086
2023/0060755 A1* 3/2023 Bharmal ............... B60W 10/20
2023/0084520 A1* 3/2023 Cattone ............. G06Q 30/0241
701/31.4

* cited by examiner

100

AUTONOMOUS QUALITY TEST SYSTEM FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to an autonomous quality test system for a vehicle, and more specifically, to an audio-based autonomous quality test system for a vehicle.

After manufacturing, vehicles undergo a series of tests. For example, vehicles may undergo a squeak and rattle test during which an occupant operates the vehicle around a track and listens for various noises. The noises may indicate that an aspect of the vehicle may need to be fixed or otherwise assessed further. However, different operators may have different opinions as to what qualifies as a noise that necessitates further assessment and/or may have different degrees of noise identification. Further, there may be inconsistencies between operators in terms of driving speed, trajectory, and other operative differences during execution of the test. Any variation may result in noise occurring under some conditions and not occurring under varied conditions. Thus, there is a need for consistency across the testing execution and the detection of potential noises.

SUMMARY

In some aspects, an autonomous quality test system for a vehicle includes a monitoring system disposed along a test track and configured to capture monitoring data, at least one audio sensor disposed at the vehicle and configured to capture audio data, and one or more vehicle system sensors configured to capture vehicle data. The autonomous quality test system also includes an onboard controller communicatively coupled with the at least one audio sensor and the one or more vehicle system sensors and an off-board controller communicatively coupled with each of the onboard controller and the monitoring system. The off-board controller is configured to execute an autonomous test algorithm based on the audio data received from the onboard controller and the monitoring data from the monitoring system. The autonomous test algorithm includes a categorization function and is configured to categorize a noise from the audio data. The autonomous test algorithm also includes a spontaneous path planning function and is configured to execute the spontaneous path planning function in response to the categorized error noise.

In some examples, the spontaneous path planning function may include an identification function configured to identify a maintenance station based on the categorized error noise. The spontaneous path planning function may be configured to generate a route to the identified maintenance station. Optionally, the onboard controller may be configured to communicate the audio data and the captured vehicle data with the off-board controller and the off-board controller may be configured to generate a control loop based on the audio data, the captured vehicle data, and the captured monitoring data. The off-board controller may be configured to transmit the control loop to the onboard controller to execute control functions of the vehicle. In some instances, the control functions may include at least one of a speed of the vehicle and a directional function of the vehicle.

In other aspects, a computer-implemented method when executed by data processing hardware causes the data processing hardware to perform operations. The operations include maneuvering, autonomously, a vehicle along a test track, monitoring, via at least one audio sensor, audio data from the vehicle during the maneuvering of the vehicle along the test track, and monitoring, via a monitoring system disposed along the test track, monitoring data of the vehicle along the test track. The operations also include executing, based on the monitored audio data, a sound detection function of an autonomous test algorithm, detecting, via the sound detection function, an error noise, and categorizing, via a categorization function of the autonomous test algorithm, the detected error noise. The operations further include identifying, based on the categorized error noise, a maintenance station and executing, in response to the identified maintenance station and categorized error noise, a spontaneous path planning function of the autonomous test algorithm.

In other examples, detecting the noise may include triangulating, via at least three audio sensors, the noise. Optionally, executing the spontaneous path planning function may include generating a route to the identified maintenance station based on the categorized error noise, and the maintenance station may be configured to address the categorized error noise. The operations may include calibrating the autonomous test algorithm based on training data captured by each of the monitoring system and the at least one audio sensor. In some instances, calibrating the autonomous test algorithm may include receiving, from one or more vehicle system sensors, vehicle data. Optionally, detecting the error noise may include identifying a noise characteristic and categorizing the error noise may include classifying the error noise based on the noise characteristic. In further examples, categorizing the error noise may include comparing, via the autonomous test algorithm, the noise characteristic with one or more of the monitoring data and vehicle data captured by one or more vehicle system sensors.

In further aspects, an autonomous quality test system for a vehicle includes data processing hardware and memory hardware in communication with the data processing hardware. The memory hardware stores instructions that when executed on the data processing hardware cause the data processing hardware to perform operations. The operations include maneuvering, autonomously, a vehicle along a test track, monitoring, via at least one audio sensor, audio data from the vehicle during the maneuvering of the vehicle along the test track, and monitoring, via a monitoring system disposed along the test track, monitoring data of the vehicle along the test track. The operations also include executing, based on the monitored audio data, a sound detection function of an autonomous test algorithm, detecting, via the sound detection function, an error noise, and categorizing, via a categorization function of the autonomous test algorithm, the detected error noise. The operations further include identifying, based on the categorized error noise, a maintenance station and executing, in response to the identified maintenance station and categorized error noise, a spontaneous path planning function of the autonomous test algorithm.

In further examples, detecting the noise may include triangulating, via at least three audio sensors, the noise. Optionally, executing the spontaneous path planning function may include generating a route to the identified maintenance station based on the categorized error noise, and the maintenance station may be configured to address the categorized error noise. The operations may include calibrating the autonomous test algorithm based on training data captured by each of the monitoring system and the at least one audio sensor. In some instances, calibrating the autonomous test algorithm may include receiving, from one or more vehicle system sensors, vehicle data. Optionally, detecting the error noise may include identifying a noise characteristic and categorizing the error noise may include classifying the error noise based on the noise characteristic. In some examples, categorizing the error noise may include comparing, via the autonomous test algorithm, the noise characteristic with one or more of the monitoring data and vehicle data captured by one or more vehicle system sensors.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
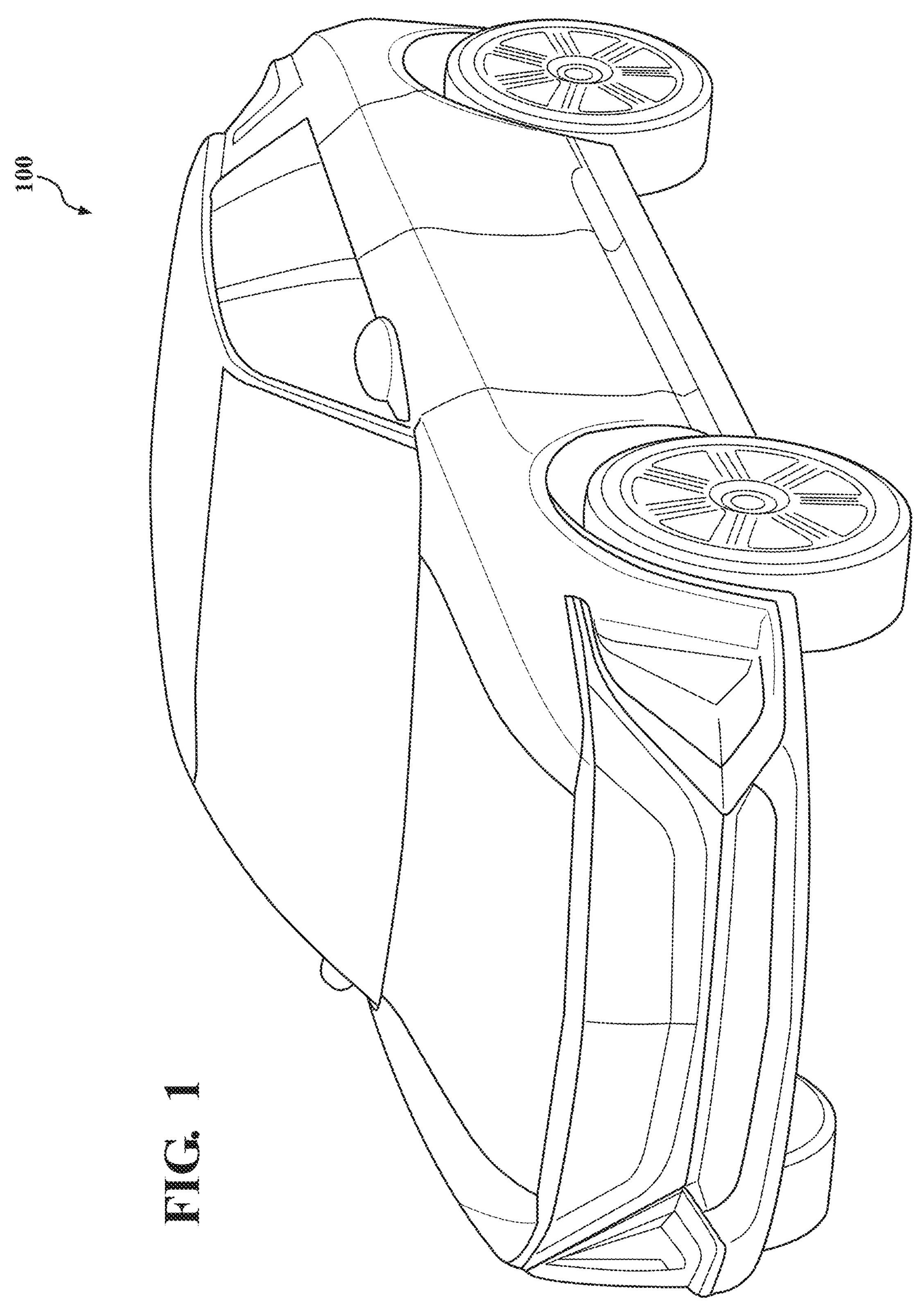
FIG. 1 is a perspective view of a vehicle according to the present disclosure.
Figure 2:
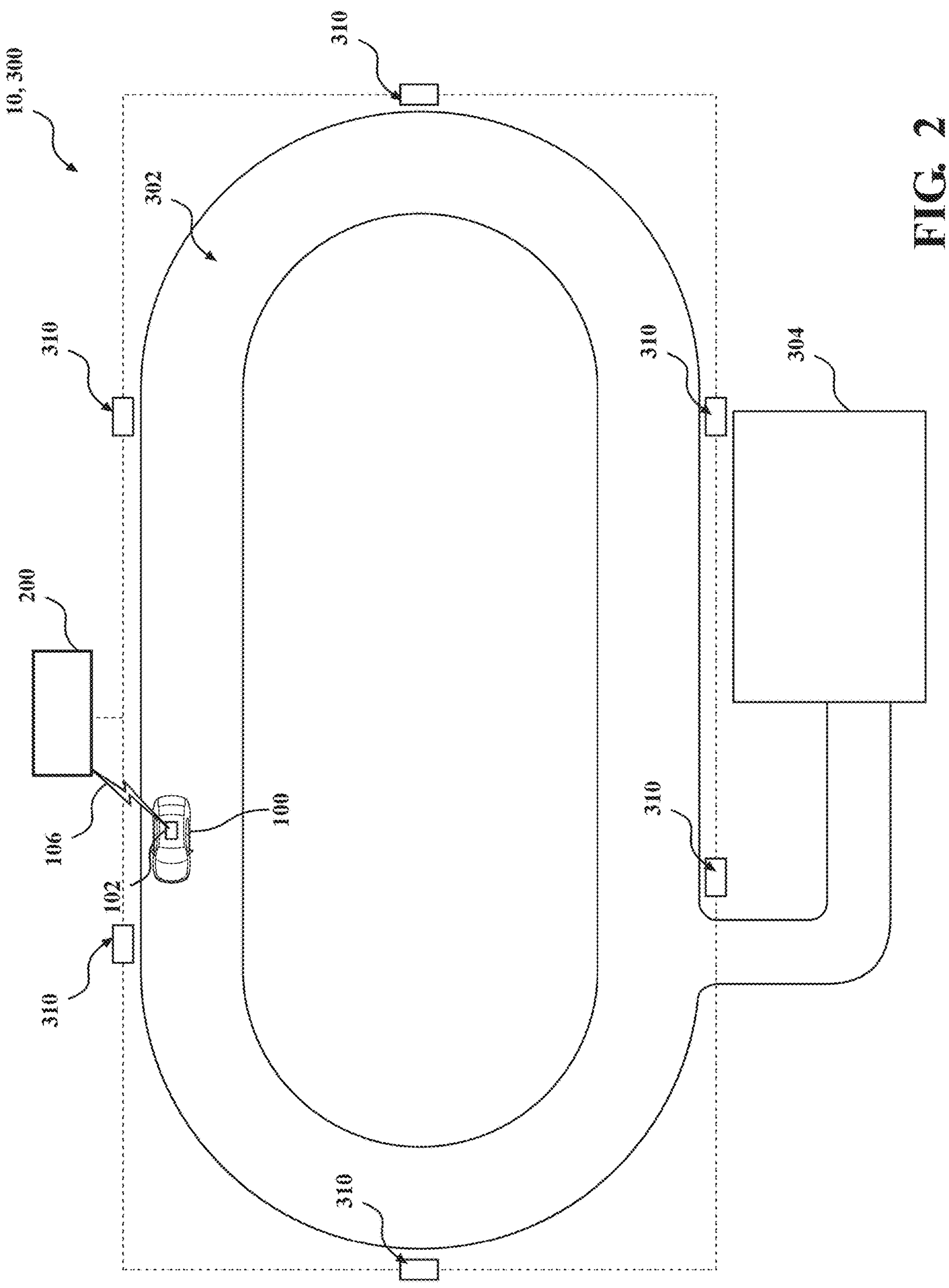
FIG. 2 is a schematic of a vehicle on a test track executing an autonomous test algorithm of an autonomous quality test system according to the present disclosure.
Figure 3:
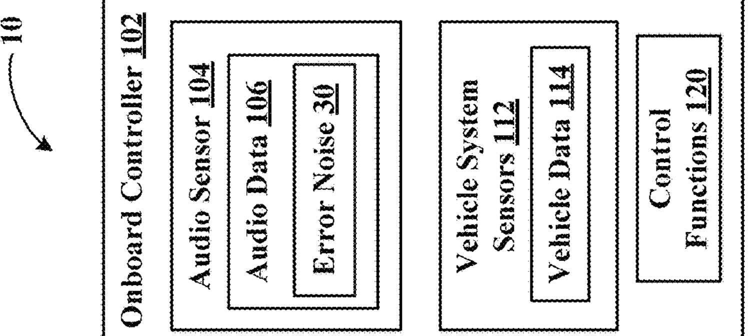
FIG. 3 is a block diagram of an autonomous quality test system according to the present disclosure.
Figure 3:
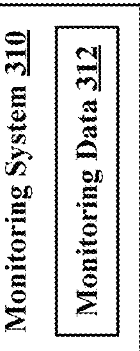
Figure 3:
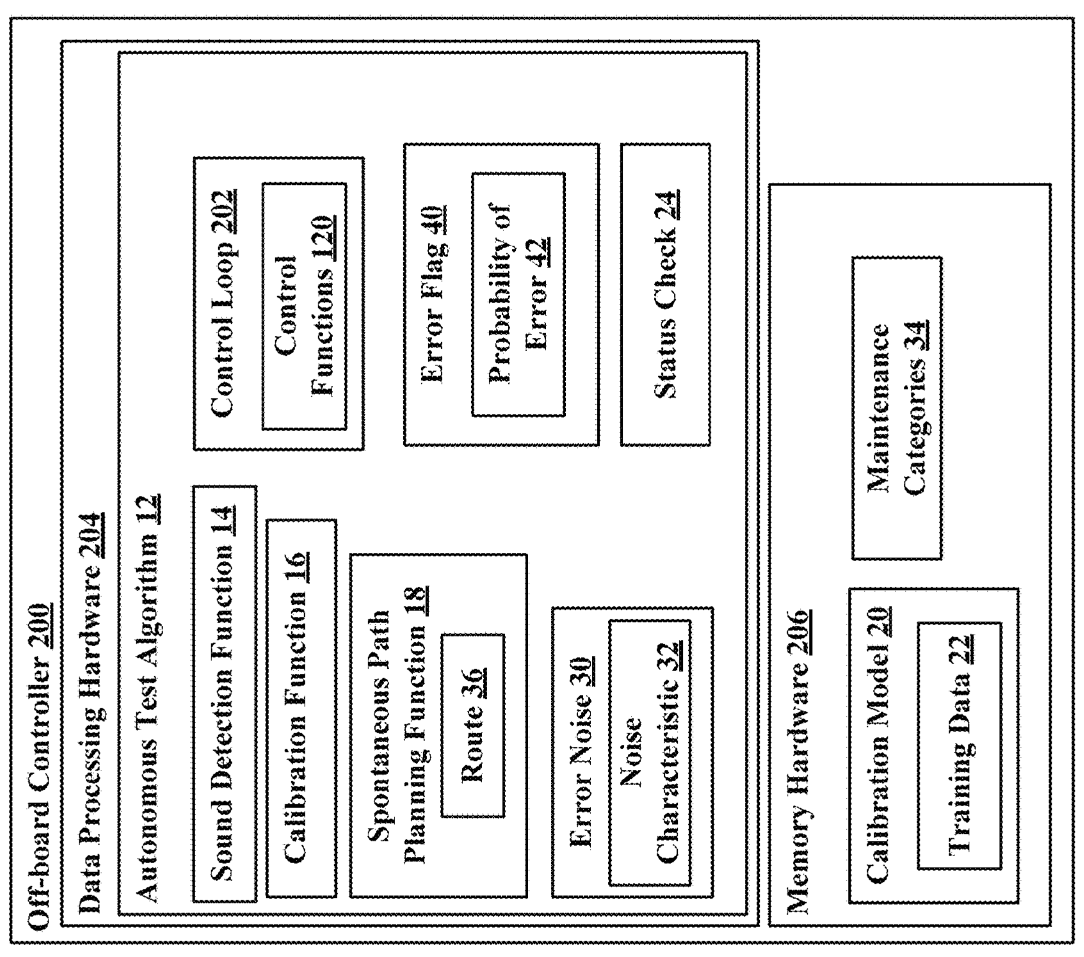
Figure 4:
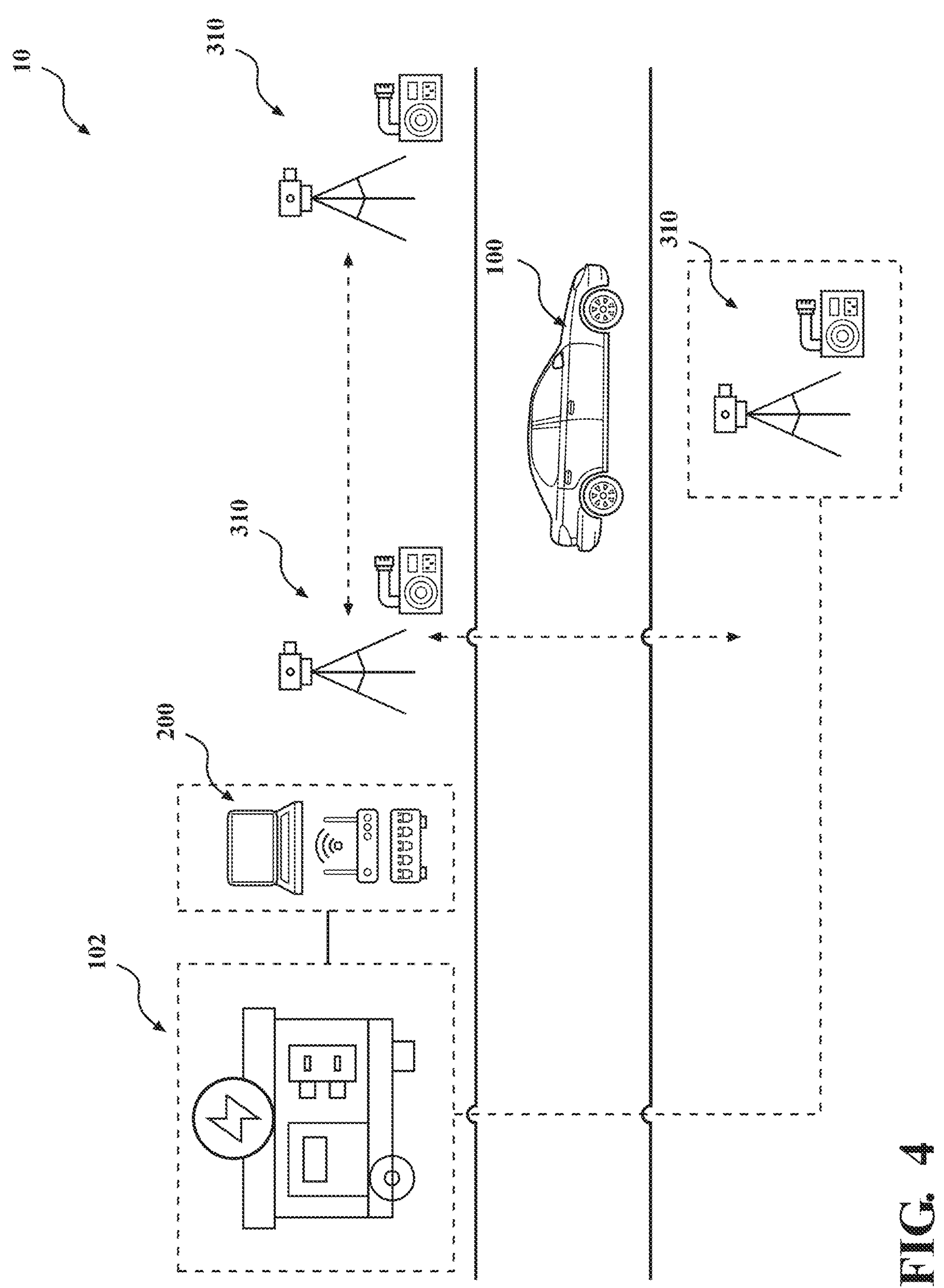
FIG. 4 is a schematic of an autonomous quality test system according to the present disclosure.
Figure 5:
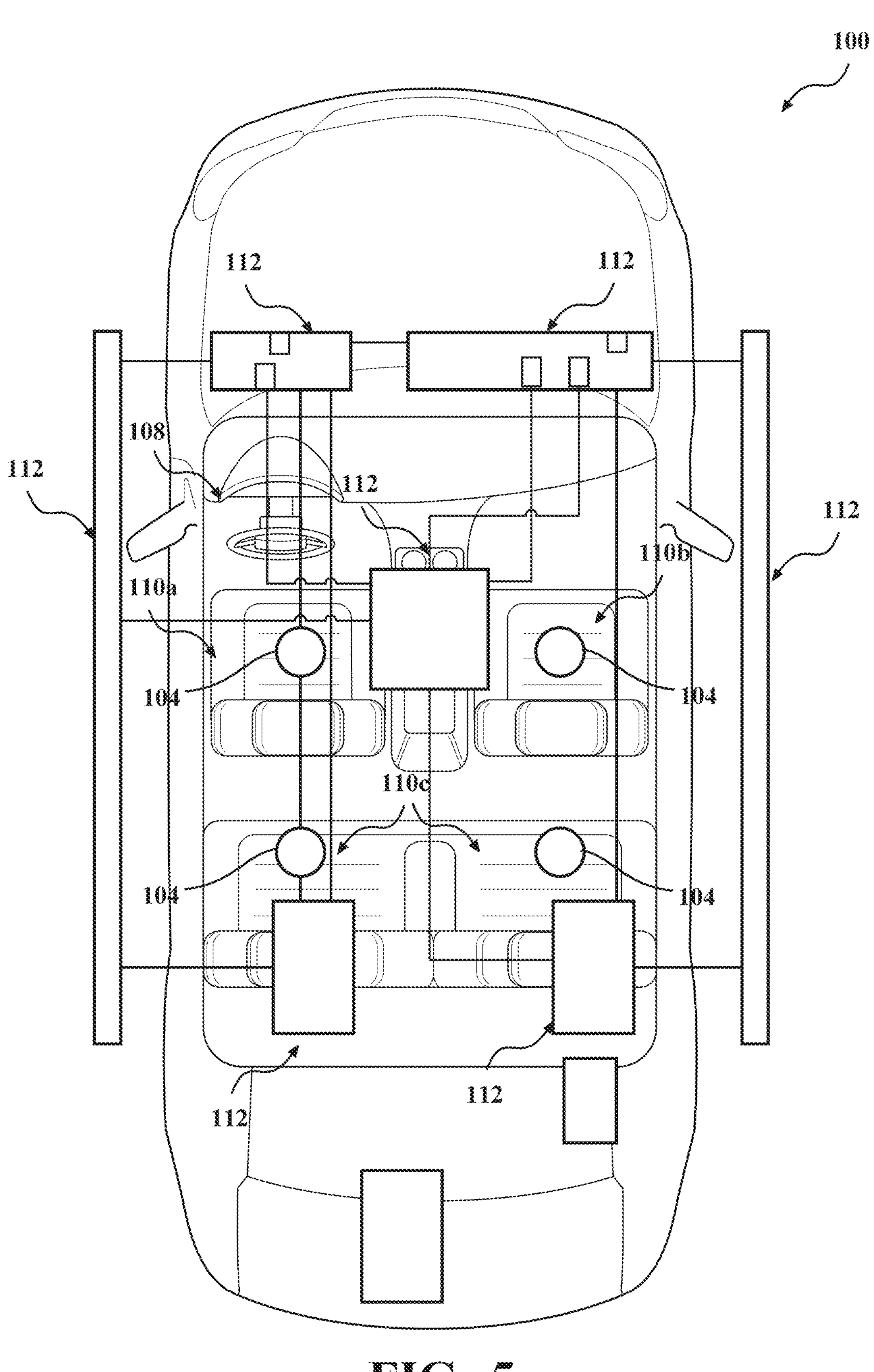
FIG. 5 is a schematic of a vehicle including vehicle system sensors and a plurality of audio sensors according to the present disclosure each in communication with an onboard controller.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-4, an autonomous quality test system 10 for a vehicle 100 includes an onboard controller 102 of the vehicle 100 and an off-board controller 200. The onboard controller 102 and the off-board controller 200 are communicatively coupled and operable during an autonomously executed testing session 300 of the vehicle 100. For example, the vehicle 100 is maneuvered around a test track 302 to execute an autonomous test algorithm 12 of the autonomous quality test system 10, described herein. The vehicle 100 is configured as an autonomous vehicle 100 and/or a semi-autonomous vehicle 100, such as a software defined vehicle. For example, an onboard controller 102 of the vehicle 100 is communicatively coupled with the off-board controller 200 that is configured to communicate a control loop 202 with the onboard controller 102 as part of the execution of the autonomous quality test system 10. The test track 302 is connected with one or more maintenance stations 304 via service roads 306, which may be accessed by the vehicle 100 during the testing session 300.

The autonomous quality test system 10 communicatively couples the onboard controller 102, the off-board controller 200, and a monitoring system 310 disposed around the test track 302. For example, the onboard controller 102 and the off-board controller 200 may be communicatively coupled via cellular connectivity including, but not limited to, 4G and 5G cellular data. The monitoring system 310 includes one or more imagers and/or light detection and ranging (LIDAR) systems configured to capture monitoring data 312 as the vehicle 100 maneuvers the test track 302. For example, the monitoring system 310 is stationed around the test track 302 and monitors the motion of the vehicle 100. The motion of the vehicle 100 is captured as the monitoring data 312 and communicated with the off-board controller 200.

The monitoring system 310 may be configured to monitor a speed and/or direction of the vehicle 100 during the testing session 300 and communicate the monitoring data 312 (e.g., the speed and/or direction) with the off-board controller 200. As described below, the off-board controller 200 utilizes the monitoring data 312 when executing the autonomous test algorithm 12. The sensors (i.e., imagers and/or LIDAR systems) of the monitoring system 310 are stationary sensors mounted around the test track 302 to capture the movement of the vehicle 100 during the testing session 300 along the test track 302. The off-board controller 200 utilizes the monitoring data 312 to execute the autonomous test algorithm 12 and communicates the control loop 202, based in part on the monitoring data 312, with the onboard controller 102.

With reference now to FIGS. 2-5, the vehicle 100 is equipped with at least one audio sensor 104 configured to capture audio data 106. For example, the audio sensor 104 may include microphones 104 disposed within an interior cabin 108 of the vehicle 100. The audio sensor 104 may include one or more audio sensors 104 (e.g., microphones) that are permanently mounted in the vehicle 100. For example, the audio sensors 104 may be used for telephone conversations executed by the onboard controller 102 during operation of the vehicle 100. The audio sensors 104 may be positioned in any practicable location along the vehicle 100 and/or inside the interior cabin 108 of the vehicle 100. In some instances, the audio sensors 104 may be positioned proximate to a driver seat 110*a*, a front passenger seat 110*b*, and rear passenger seats 110*c*. Thus, the onboard controller 102 may capture and acquire the audio data 106 from one or more of the audio sensors 104 in various positions within the vehicle 100.

The vehicle 100 may also be equipped with various vehicle system sensors 112 that are configured to capture vehicle data 114. For example, the vehicle system sensors 112 may include, but are not limited to, cameras, LIDAR, speedometer, pressure sensors, temperature sensors, steering sensors, and other vehicle system sensors 112 that may be equipped with the vehicle 100. The onboard controller 102 may receive the vehicle data 114 in addition to the audio data 106, which may be utilized by the autonomous test algorithm 12 to evaluate the vehicle 100 during the test session 300, described in more detail below.

Referring still to FIGS. 2-5, the onboard controller 102 is configured to communicate the audio data 106 and the captured vehicle data 114 with the off-board controller 200. The off-board controller 200 is configured to generate the control loop 202 based on the audio data 106, the captured vehicle data 114, and the captured monitoring data 312. The control loop 202 is a control algorithm generated by the off-board controller 200, which is configured to autonomously control the movement of the vehicle 100. For example, the control loop 202 may be transmitted to the onboard controller 102 to execute control functions 120 of the vehicle 100.

In some examples, the control functions 120 may include at least one of a speed of the vehicle 100 and a directional function of the vehicle 100. For example, the control loop 202 may include instructions to increase or decrease a speed of the vehicle 100 and/or change a direction of a trajectory of the vehicle 100. As mentioned above, the off-board controller 200 may communicate the control loop 202 with the onboard controller 102 via a cellular network, and the onboard controller 102 executes the control functions 120 corresponding to the control loop 202. In some instances, the control loop 202 may include instructions to redirect the vehicle 100 toward a maintenance station 304 in response to the autonomous test algorithm 12, described below.

The off-board controller 200 is configured to execute the autonomous test algorithm 12 based on the audio data 106 received from the onboard controller 102 and the monitoring data 312 from the monitoring system 310. The autonomous test algorithm 12 is executed by data processing hardware 204 of the off-board controller. The off-board controller 200 may also include memory hardware 206 in communication with the data processing hardware 204. The memory hardware 206 may store instructions that, when executed on the data processing hardware 204, cause the data processing hardware 204 to perform operations (i.e., executing the autonomous test algorithm 12). The autonomous test algorithm 12 includes a sound detection function 14, a categorization function 16, and a spontaneous path planning function 18, each described in detail below.

With further reference to FIGS. 2-5, the memory hardware 206 may store a calibration model 20 of the autonomous quality test system 10 that may be utilized to calibrate the autonomous test algorithm 12 prior to execution of the testing session 300. The calibration model 20 may include training data 22 that includes, but is not limited to, predefined frequencies and/or amplitudes that may correspond to an error noise 30. The autonomous quality test system 10 is configured to detect and categorize the error noise 30, such that the training data 22 assists in training the autonomous test algorithm 12 via the calibration model 20. The calibration model 20 may be further utilized to validate the audio sensors 104 by playing training data 22 corresponding to an error noise 30 to ensure detection by the audio sensors 104. Thus, the calibration model 20 may be utilized to tune and check the audio sensors 104 in addition to training the autonomous test algorithm 12.

After the calibration model 20 is executed, the autonomous test algorithm 12 is trained to identify various error noises 30. The autonomous test algorithm 12 may be continually trained and retrained using the calibration model 20 to update and improve the detection of error noises 30. For example, additional error noises 30 may be added to the training data 22, such that the autonomous test algorithm 12 may be retrained by the calibration model 20 to update the ability to identify new error noises 30. Thus, the autonomous test algorithm 12 is pre-trained (i.e., at initial manufacturing of the vehicle 100) and is able to be retrained (i.e., during or after a testing session 300 for further testing sessions 300).

Referring still to FIGS. 2-5, the off-board controller 200 is configured to receive the audio data 106, the monitoring data 312, and the vehicle data 114, which is each respectively evaluated by the autonomous test algorithm 12. For example, the autonomous test algorithm 12 monitors the audio data 106 and the monitoring data 312 and executes, based on the monitored audio data 106, the sound detection function 14. The autonomous test algorithm 12 utilizes the sound detection function 14 to parse through the audio data 106 to detect an error noise 30. The autonomous test algorithm 12, via the off-board controller 200, is configured to cooperate with the onboard controller 102 to isolate and/or activate different audio sensors 104 based on the audio data 106. For example, the sound detection function 14 may issue an error flag 40, which may or may not be associated with an error noise 30. The off-board controller 200 may communicate with the onboard controller 102 to triangulate the audio sensors 104 to improve the potential detection of the error noise 30. The triangulation instructions may be included as part of the control loop 202, mentioned above.

The autonomous test algorithm 12 utilizes the monitoring data 312 and the vehicle data 114 as reference points for executing the categorization function 16. For example, the audio data 106 is aggregated and conditioned by the autonomous test algorithm 12 along with the monitoring data 312 and the vehicle data 114. The autonomous test algorithm 12 may then execute the categorization function 16 to categorize the error noise 30 from the audio data 106. The categorization function 16 may utilize the monitoring data 312 and the vehicle data 114 to identify a source of the error noise 30. The sound detection function 14 may detect a noise characteristic 32, which may also be used by the categorization function 16 to classify the identified error noise 30. For example, the categorization function 16 may compare the noise characteristic 32 with one or more of the monitoring data 312 and the vehicle data 114.

The autonomous test algorithm 12 utilizes the classified or categorized error noise 30 to execute the spontaneous path planning function 18. The autonomous test algorithm 12 identifies, based on the categorized error noise 30, the maintenance station 304 corresponding to the category associated with the error noise 30. For example, the memory hardware 206 may store maintenance categories 34 that may be utilized as part of the categorization function 16 and during the spontaneous path planning function 18. The maintenance categories 34 may be associated with different maintenance stations 304 and the services offered at each respective maintenance station 304. Thus, the spontaneous path planning function 18 is executed in response to the categorized error noise 30 and the identified maintenance station 304.

The spontaneous path planning function 18 generates a route 36 based on the categorization of the error noise 30. The spontaneous path planning function 18 automatically executes in response to the categorization of the error noise 30 and is configured to provide the route 36 to the maintenance station 304 for repair. The autonomous test algorithm 12 may be configured to generate an error flag 40 indicating a probability of error 42 of the error noise 30. For example, the probability of error 42 reflects the likelihood (e.g., probability) that the error noise 30 is associated with a particular feature, function, or setting for repair. The spontaneous path planning function 18 utilizes the error flag 40 and the probability of error 42, in combination with the classification of the error noise 30, to identify the maintenance station 304 and generate the route 36 to the maintenance station 304. The maintenance station 304 is configured to address the categorized error noise 30, such that the error noise 30 can be repaired at the maintenance station 304. The maintenance station 304 includes a plurality of maintenance stations 304 that may be at separate or independent locations, such that the spontaneous path planning function 18 is configured to identify the best-fit maintenance station 304 based on the categorized error noise 30. The spontaneous path planning function 18 is also configured to generate the route 36 to the maintenance station 304 that is best equipped to address the error noise 30.

Figures 6A, 6B:
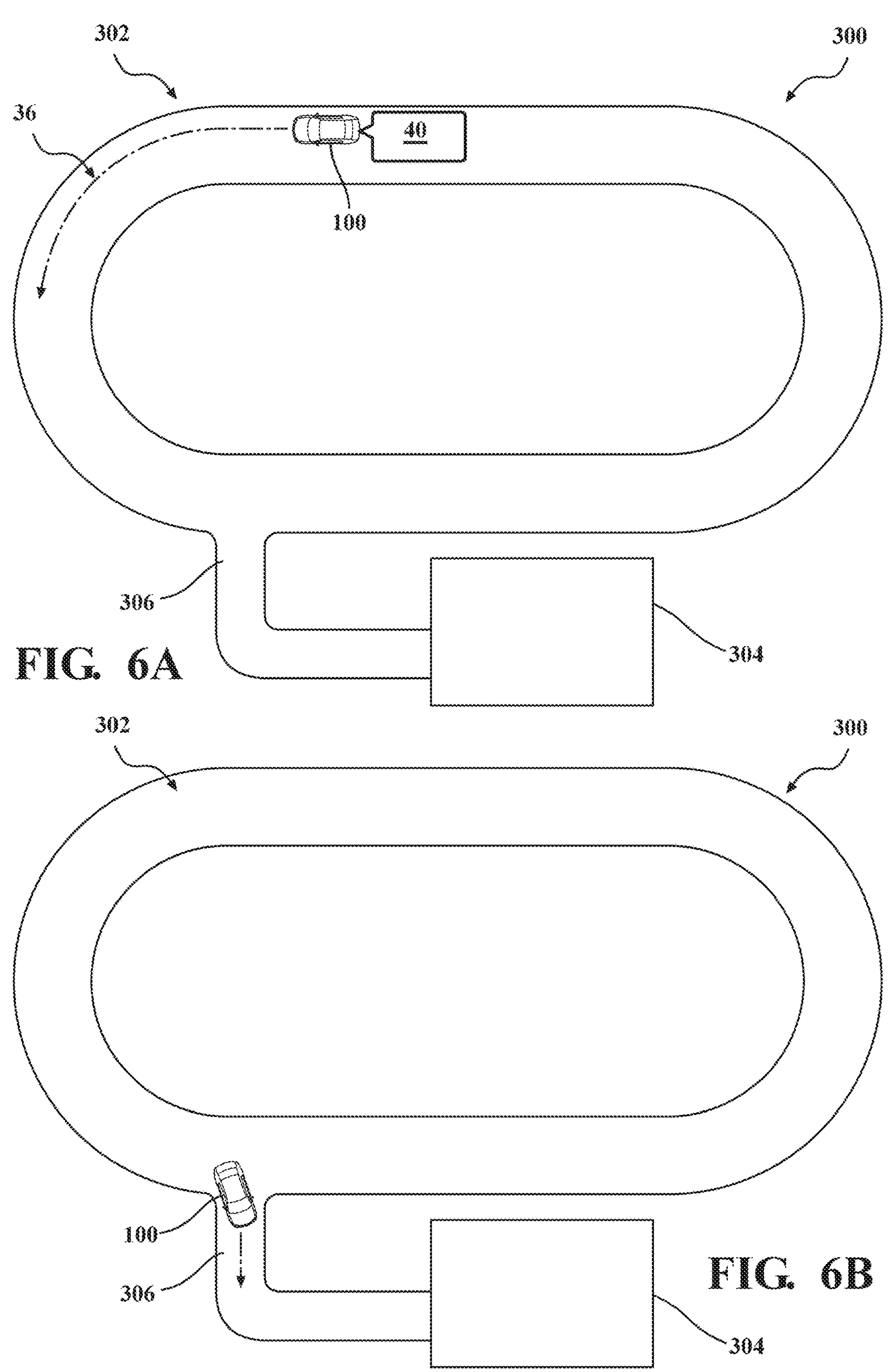
FIG. 6A is a schematic of a vehicle on a test track as part of an autonomous quality test system according to the present disclosure, an alert of the autonomous quality test system being issued.
FIG. 6B is a schematic of the vehicle on the test track of FIG. 6A, the quality test system executing autonomous routing in response to the issued alert.
Figure 6C:
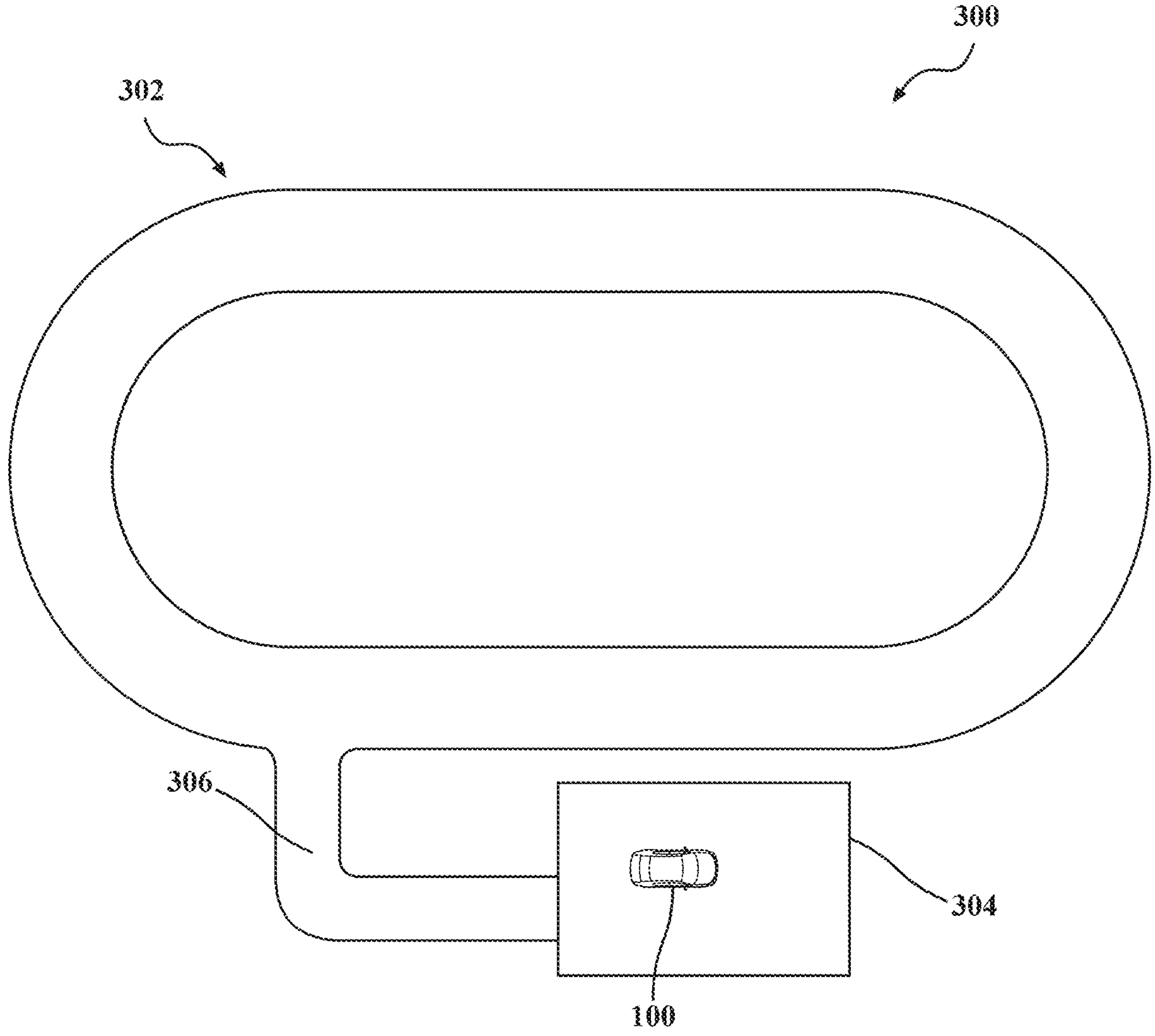
FIG. 6C is a schematic of the vehicle on the test track of FIG. 6B, the vehicle routed to a fix station.

With reference to FIGS. 3 and 6A-6C, the autonomous quality test system 10 is illustrated with a vehicle 100 maneuvering along a test track 302 during a testing session 300. The audio data 106 captured includes an error noise 30, which is illustrated as an alert for illustrative purposes. The error noise 30 is captured by the onboard controller 102 and communicated with the off-board controller 200 for processing by the autonomous test algorithm 12. Once the autonomous test algorithm 12 executes the sound detection function 14 and the categorization function 16, described above, the autonomous test algorithm 12 generates the route 36 via the spontaneous path planning function 18. The route 36 is communicated by the off-board controller 200 to the onboard controller 102 as part of the control loop 202. For example, the control loop 202 may include instructions to re-route the vehicle 100 to the route 36. FIG. 6B illustrates the vehicle 100 being routed toward the maintenance station 304, and FIG. 6C illustrates the vehicle 100 at the respective maintenance station 304. Although a single maintenance station 304 is depicted, it is contemplated that any number of maintenance stations 304 may be identified and utilized as part of the autonomous quality test system 10, as mentioned above.

Figure 7:
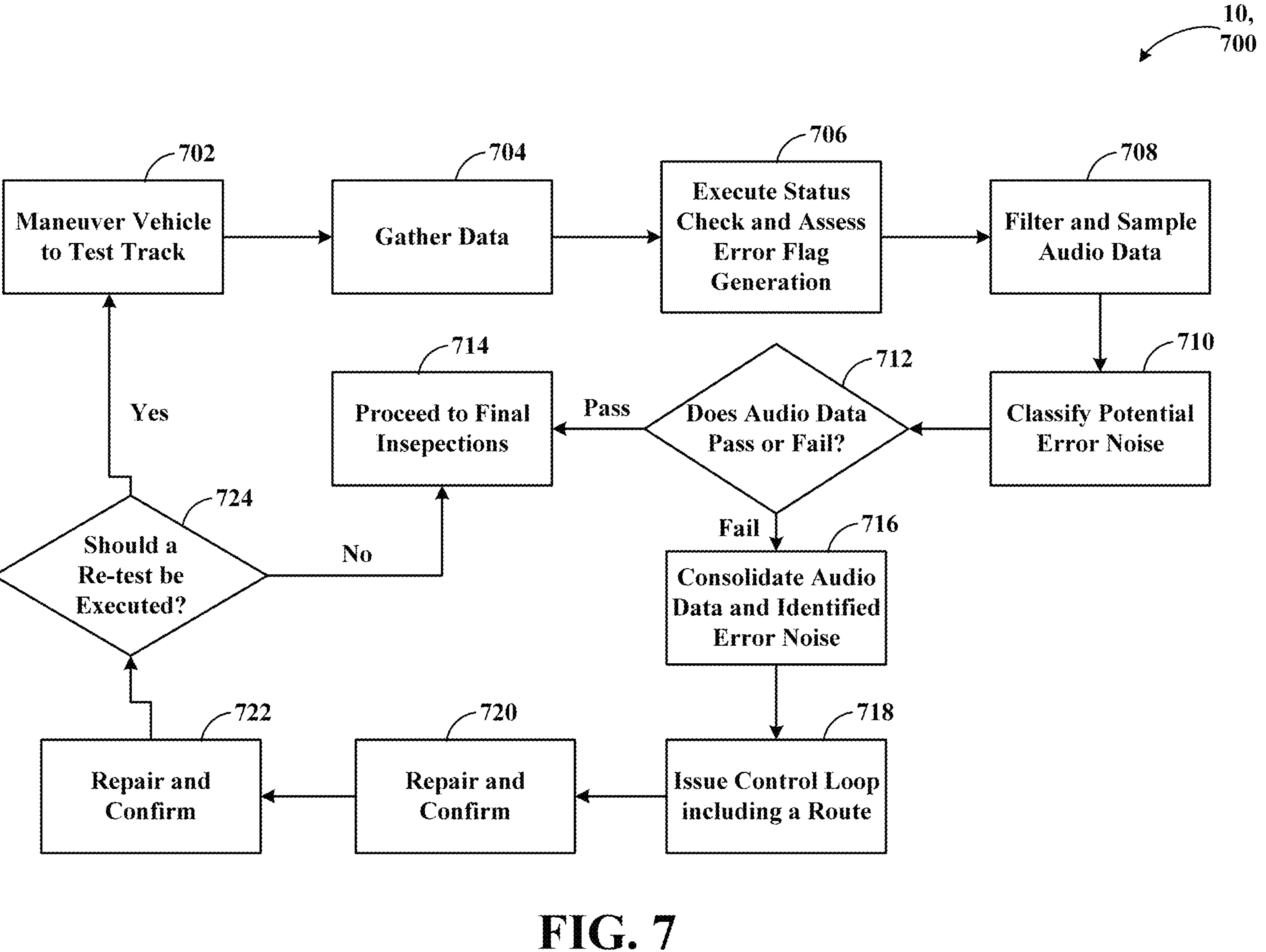
FIG. 7 is an example flow diagram of an autonomous quality test system according to the present disclosure.

Referring to FIGS. 1-7, a method 700 of operating the autonomous quality test system 10 is set forth. Specifically, the method 700 is illustrated in FIG. 7. At 702, the vehicle 100 is maneuvered to the test track 302 and is accelerated to a predetermined speed. At 704, the autonomous quality test system 10 begins to gather data including the monitoring data 312, the vehicle data 114, and the audio data 106. At 706, the off-board controller 200 executes a status check 24 of the autonomous quality algorithm 12 to assess whether an error flag 40 has been generated. At 708, the off-board controller 200, via the autonomous test algorithm 12, filters and samples the audio data 106 in order to identify potential error noise 30. At 710, any potential identified error noise 30 is classified by the categorization function 16. At 712, the autonomous quality test system 10 determines whether the audio data 106, including any potential error noise 30, passes or fails the testing session 300. If no significant error noise 30 is identified, the off-board controller 200 may issue, at 714, a pass for the audio data 106, and the vehicle 100 may proceed with final inspections.

If an error noise 30 is identified and categorized, the off-board controller 200 consolidates, at 716, the audio data 106 and the identified error noise 30 and sends, at 718, an error flag 40 to manufacturing execution systems of the maintenance stations 304. The off-board controller 200 then issues, at 720, the control loop 202 including the route 36 to the maintenance station 304. At 722, repair and confirmation is executed on the vehicle 100. The repair personnel determine, at 724, whether to re-test the vehicle 100 using the autonomous quality test system 10.

Referring again to FIGS. 1-7, the autonomous quality test system 10 advantageously automates the testing sessions 300 after manufacture of vehicles 100. The use of audio sensors 104 to capture audio data 106 for evaluation of the vehicle 100 ensures consistency in detection of potential error noise 30. Further, the categorization of the error noise 30 by the autonomous test algorithm 12 advantageously allows the autonomous quality test system 10 to identify the maintenance station 304 associated with the error noise 30.

For example, the autonomous test algorithm 12 may accurately identify that the error noise 30 corresponds with loose trim and generates the route 36 using the spontaneous path planning function 18 based on the identified and categorized error noise 30. The ability to direct the vehicle 100 to the proper maintenance station 304 improves the overall efficiency of identifying a potential error and fixing the identified error. For example, automating the testing process and route generation improves the likelihood of consistent identification of errors as a result of consistent execution of the testing procedures.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An autonomous quality test system for a vehicle, the autonomous quality test system comprising:

a monitoring system disposed along a test track and configured to capture monitoring data;

at least one audio sensor disposed at the vehicle and configured to capture audio data;

one or more vehicle system sensors configured to capture vehicle data;

an onboard controller communicatively coupled with the at least one audio sensor and the one or more vehicle system sensors; and an off-board controller communicatively coupled with each of the onboard controller and the monitoring system, the off-board controller configured to execute an autonomous test algorithm based on the audio data received from the onboard controller and the monitoring data from the monitoring system, the autonomous test algorithm including a categorization function and configured to categorize an error noise from the audio data, the autonomous test algorithm also including a spontaneous path planning function and configured to execute the spontaneous path planning function in response to the categorized error noise, the off-board controller configured to generate a control loop based on the audio data, the captured vehicle data, and the captured monitoring data, the control loop including control functions of the vehicle, the off-board controller also configured to transmit the control loop to the onboard controller to execute control functions of the vehicle.

2. The autonomous quality test system of claim 1, wherein the spontaneous path planning function includes an identification function configured to identify a maintenance station based on the categorized error noise.

3. The autonomous quality test system of claim 2, wherein the spontaneous path planning function is configured to generate a route to the identified maintenance station.

4. The autonomous quality test system of claim 1, wherein the control functions include at least one of a speed of the vehicle and a directional function of the vehicle.

5. A computer-implemented method when executed by data processing hardware causes the data processing hardware to perform operations comprising:

maneuvering, autonomously, a vehicle along a test track;

monitoring, via at least one audio sensor, audio data from the vehicle during the maneuvering of the vehicle along the test track;

monitoring, via a monitoring system disposed along the test track, monitoring data of the vehicle along the test track;

executing, based on the monitored audio data, a sound detection function of an autonomous test algorithm;

detecting, via the sound detection function, an error noise;

categorizing, via a categorization function of the autonomous test algorithm, the detected error noise;

identifying, based on the categorized error noise, a maintenance station;

executing, in response to the identified maintenance station and categorized error noise, a spontaneous path planning function of the autonomous test algorithm and generating a control loop including control functions of the vehicle; and transmitting the control loop to the vehicle to cause the vehicle to autonomously navigate, via the control functions of the vehicle, to the identified maintenance station.

6. The method of claim 5, wherein detecting the noise includes triangulating, via at least three audio sensors, the noise.

7. The method of claim 5, wherein executing the spontaneous path planning function includes generating a route to the identified maintenance station based on the categorized error noise, the maintenance station configured to address the categorized error noise.

8. The method of claim 5, further including calibrating the autonomous test algorithm based on training data captured by each of the monitoring system and the at least one audio sensor.

9. The method of claim 8, wherein calibrating the autonomous test algorithm includes receiving, from one or more vehicle system sensors, vehicle data.

10. The method of claim 5, wherein detecting the error noise includes identifying a noise characteristic and categorizing the error noise includes classifying the error noise based on the noise characteristic.

11. The method of claim 10, wherein categorizing the error noise includes comparing, via the autonomous test algorithm, the noise characteristic with one or more of the monitoring data and vehicle data captured by one or more vehicle system sensors.

12. An autonomous quality test system for a vehicle, the autonomous quality test system comprising:

data processing hardware; and memory hardware in communication with the data processing hardware, the memory hardware storing instructions that when executed on the data processing hardware cause the data processing hardware to perform operations comprising:

maneuvering, autonomously, a vehicle along a test track;

monitoring, via at least one audio sensor, audio data from the vehicle during the maneuvering of the vehicle along the test track;

monitoring, via a monitoring system disposed along the test track, monitoring data of the vehicle along the test track;

executing, based on the monitored audio data, a sound detection function of an autonomous test algorithm;

detecting, via the sound detection function, an error noise;

categorizing, via a categorization function of the autonomous test algorithm, the detected error noise;

identifying, based on the categorized error noise, a maintenance station;

executing, in response to the identified maintenance station and categorized error noise, a spontaneous path planning function of the autonomous test algorithm and generating a control loop including control functions of the vehicle; and transmitting the control loop to the vehicle to cause the vehicle to autonomously navigate, via the control functions of the vehicle, to the identified maintenance station.

13. The autonomous quality test system of claim 12, wherein detecting the noise includes triangulating, via at least three audio sensors, the noise.

14. The autonomous quality test system of claim 12, wherein executing the spontaneous path planning function includes generating a route to the identified maintenance station based on the categorized error noise, the maintenance station configured to address the categorized error noise.

15. The autonomous quality test system of claim 12, further including calibrating the autonomous test algorithm based on training data captured by each of the monitoring system and the at least one audio sensor.

16. The autonomous quality test system of claim 15, wherein calibrating the autonomous test algorithm includes receiving, from one or more vehicle system sensors, vehicle data.

17. The autonomous quality test system of claim 12, wherein detecting the error noise includes identifying a noise characteristic and categorizing the error noise includes classifying the error noise based on the noise characteristic.

18. The autonomous quality test system of claim 17, wherein categorizing the error noise includes comparing, via the autonomous test algorithm, the noise characteristic with one or more of the monitoring data and vehicle data captured by one or more vehicle system sensors.

* * * * *